(12) United States Patent
Beak et al.

(10) Patent No.: US 10,710,297 B2
(45) Date of Patent: Jul. 14, 2020

(54) THREE-DIMENSIONAL PRINTER AND OPERATING METHOD FOR THE SAME

(71) Applicant: SAMSUNG ELECTRONICS CO., LTD., Suwon-si, Gyeonggi-do (KR)

(72) Inventors: Ohyun Beak, Seoul (KR); Keon Kuk, Yongin-si (KR); Yeon Kyoung Jung, Seoul (KR); Eun Bong Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 521 days.

(21) Appl. No.: 14/582,335

(22) Filed: Dec. 24, 2014

(65) Prior Publication Data

US 2015/0183163 A1    Jul. 2, 2015

(30) Foreign Application Priority Data

Dec. 30, 2013 (KR) .......................... 10-2013-0166578

(51) Int. Cl.
| | | |
|---|---|---|
| *B29C 64/112* | (2017.01) | |
| *B33Y 30/00* | (2015.01) | |
| *B33Y 40/00* | (2020.01) | |
| *B33Y 10/00* | (2015.01) | |
| *B29K 105/00* | (2006.01) | |

(52) U.S. Cl.
CPC .... *B29C 64/112* (2017.08); *B29K 2105/0058* (2013.01); *B33Y 10/00* (2014.12); *B33Y 30/00* (2014.12); *B33Y 40/00* (2014.12)

(58) Field of Classification Search
CPC ............................ B29C 67/0059; B33Y 10/00
See application file for complete search history.

(56) References Cited

U.S. PATENT DOCUMENTS

| | | |
|---|---|---|
| 6,165,406 A | 12/2000 | Jang et al. |
| 6,193,923 B1 | 2/2001 | Leyden et al. |
| 6,270,199 B1 | 8/2001 | Kimura et al. |

(Continued)

FOREIGN PATENT DOCUMENTS

| | | |
|---|---|---|
| CN | 102001123 | 4/2011 |
| CN | 103009630 | 4/2013 |

(Continued)

OTHER PUBLICATIONS

Extended European Search Report dated May 15, 2015 in corresponding European Application No. 14200474.6.

(Continued)

*Primary Examiner* — Joseph S Del Sole
*Assistant Examiner* — John Robitaille
(74) *Attorney, Agent, or Firm* — Staas & Halsey LLP

(57) ABSTRACT

A three-dimensional printer and an operating method are provided. The three-dimensional printer includes at least one print head and a stage in which chemical ink injected from the print head may be layered. The three-dimensional printer includes a print head including a head chip injecting the chemical ink, wherein the head chip may include an ink chamber receiving the chemical ink, a heater generating a bubble in the ink chamber by applying heat to the chemical ink of the ink chamber, and a nozzle injecting the chemical ink according to an internal pressure of the ink chamber increased by the generated bubble.

6 Claims, 8 Drawing Sheets

(56) References Cited

U.S. PATENT DOCUMENTS

| | | | |
|---|---|---|---|
| 2004/0217186 A1 | 11/2004 | Sachs et al. | |
| 2005/0248065 A1* | 11/2005 | Owada | B29C 64/106 264/494 |
| 2009/0160912 A1 | 6/2009 | Silverbrook et al. | |
| 2011/0054663 A1 | 3/2011 | Matsui et al. | |

FOREIGN PATENT DOCUMENTS

| | | | |
|---|---|---|---|
| CN | 103395207 | 11/2013 | |
| EP | 2 292 412 A | 3/2011 | |
| EP | 2572864 | 3/2013 | |
| JP | 2012-45708 | 3/2012 | |
| WO | WO 2008/051063 A2 | 12/2008 | |
| WO | WO 2008/051063 A3 | 12/2008 | |
| WO | 2013/132484 | 9/2013 | |
| WO | WO-2013167528 A1 * | 11/2013 | B29C 67/0059 |

OTHER PUBLICATIONS

PCT International Search Report dated Mar. 24, 2015 in corresponding International Application No. PCT/KR2014/012951.
European Office Action dated Jan. 20, 2017 in corresponding European Patent Application No. 14200474.6.
Chinese Office Action dated Dec. 15, 2017 in Chinese Patent Application No. 201480071791.5.
Chinese Office Action dated Sep. 5, 2018 in Chinese Patent Application No. 201480071791.5.
Chinese Office Action dated Sep. 29, 2019 in Chinese Patent Application No. 201480071791.5.
Chinese Office Action dated Mar. 22, 2019 in Chinese Patent Application No. 201480071791.5.
European Summons to Attend Oral Proceedings dated Feb. 21, 2020 in European Patent Application No. 14200474.6.

* cited by examiner

THREE-DIMENSIONAL PRINTER AND OPERATING METHOD FOR THE SAME

CROSS-REFERENCE TO RELATED APPLICATIONS

This application is related to, and claims the priority benefit of, Korean Patent Application No. 10-2013-0166578, filed on Dec. 30, 2013 in the Korean Intellectual Property Office, the disclosure of which is incorporated herein by reference.

BACKGROUND

1. Field

Embodiments of the present disclosure relate to a three-dimensional printer manufacturing a three-dimensional object and a three-dimensional printing method thereof.

2. Description of the Related Art

In general, a three-dimensional (3D) printer is an apparatus to manufacture a three-dimensional object and includes a print head injecting chemical ink, and a stage in which the chemical ink injected from the print head is layered, etc.

In a 3D printer, a head chip provided in the print head may include an ink chamber receiving chemical ink, a piezoelectric element transformed according to applying a current to increase an internal pressure of the ink chamber, and a nozzle injecting the chemical ink stored in the ink chamber according to the increase of the internal pressure of the ink chamber by the piezoelectric element.

So that the chemical ink stored inside the ink chamber may be injected through the nozzle, sufficient pressure may be applied to the ink chamber. To provide enable the supply of sufficient pressure, the piezoelectric element may have to be of a large size and thus there are difficulties in miniaturizing the 3D printer.

SUMMARY

It is an aspect of the present disclosure to provide a three-dimensional (3D) printer capable of manufacturing a three-dimensional object by using a bubble jet method.

Additional aspects of the present disclosure will be set forth in part in the description which follows and, in part, will be obvious from the description, or may be learned by practice of the invention.

In accordance with an aspect of the present disclosure, a three-dimensional printer includes at least one print head and a stage in which chemical ink injected from the print head may be layered, wherein the at least one print head may include a head chip injecting the chemical ink, wherein the head chip may include an ink chamber receiving the chemical ink, a heater generating a bubble in the ink chamber by applying heat to the chemical ink of the ink chamber, and a nozzle injecting the chemical ink according to an internal pressure of the ink chamber increased by the generated bubble.

The chemical ink may include photocurable chemical ink and the 3D printer may include a light source irradiating light to chemical ink stacked on the stage.

The chemical ink may include an ultraviolet curable chemical ink hardening by ultraviolet rays, and the light source may include an ultraviolet light emitting diode lamp.

The at least one print head may be installed to be moved horizontally in a first direction and the stage may be installed to be moved horizontally in a second direction perpendicular to the first direction.

Any one of the at least one print head and the stage may be installed to be movable upward and downward.

The at least one print head may include at least one print head among a first print head injecting black color chemical ink, a second print head injecting magenta color chemical ink, a third print head injecting cyan color chemical ink, and a fourth print head injecting yellow color chemical ink.

The 3D printer may include a first ink tank supplying black color chemical ink the first print head, a second ink tank supplying magenta color chemical ink to the second print head, a third ink tank supplying cyan color chemical ink to the third print head, and a fourth ink tank supplying yellow color chemical ink to the fourth print head.

In accordance with an aspect of the present disclosure, an operating method of a three-dimensional printer provided with a print head including a head chip, and a stage in which chemical ink injected from the head chip is stacked includes supplying chemical ink to an ink chamber disposed in the head chip, heating the chemical ink inside the ink chamber with a heater, and injecting the chemical ink to the stage through a nozzle provided on the head chip by a bubble generated by heat applied by the heater.

The supplying of the chemical ink to the ink chamber may be supplying the chemical ink from the ink tank by negative pressure of the inside of the ink chamber.

The negative pressure may be generated after the chemical ink inside the ink chamber may be injected to the nozzle.

The method may further include hardening the chemical ink stacked on the stage by irradiating light on the chemical ink.

The light may be ultraviolet rays and the chemical ink may include ultraviolet curable chemical ink.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Figure 1:
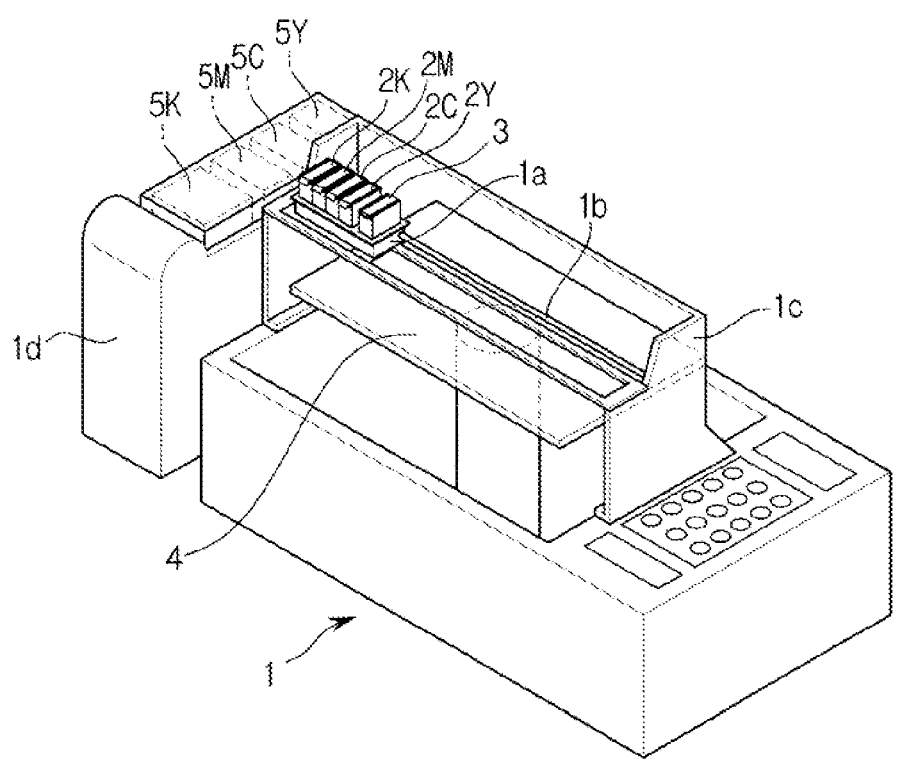
FIG. 1 is a perspective view illustrating a three-dimensional printer (3D printer) according to an embodiment of the present disclosure.

Reference will now be made in detail to embodiments of the present disclosure, examples of which are illustrated in the accompanying drawings, wherein like reference numerals refer to like elements throughout.

As illustrated in FIG. 1, a three-dimensional printer (3D printer) according to an embodiment of the present disclosure may include a body 1, a plurality of print heads 2K, 2M, 2C, 2Y, disposed, for example, on an upper portion of the body 1 to inject chemical ink, for example, downward, a stage 4 in which the chemical ink injected from the plurality of print heads 2K, 2M, 2C, 2Y is layered, a light source hardening the chemical ink layered on the stage 4 by applying light and a plurality of ink tanks 5K, 5M, 5C, 5Y supplying the chemical ink to the print heads 2K, 2M, 2C, 2Y.

The chemical ink for the 3D printer may include oligomer and monomer forming a three-dimensional object, a photo initiator beginning polymerizing by light, a pigment expressing colors, an anti-kotion agent preventing foreign material generated from the chemical ink from sticking to a heater 21b, and an anti-bleeding agent preventing one chemical ink from being mixed with another chemical ink.

According to an embodiment of the present disclosure, the chemical ink may include material having a lower boiling point so that the chemical ink may generate a bubble at a lower temperature. The material having a lower boiling point may include alcohol, such as methanol and ethanol.

The body 1 may include a transfer module 1a in which the print heads 2K, 2M, 2C, 2Y and the light source 3 may be mounted, a guide road 1b guiding the transfer module 1a in a first direction by extending in the first direction, and a support bracket 1c supporting both ends of the guide road 1b. An Ink storage unit 1d in which the plurality of ink tanks 5K, 5M, 5C, 5Y is separately mounted may be provided, for example, on one side of the body 1.

Figure 2:
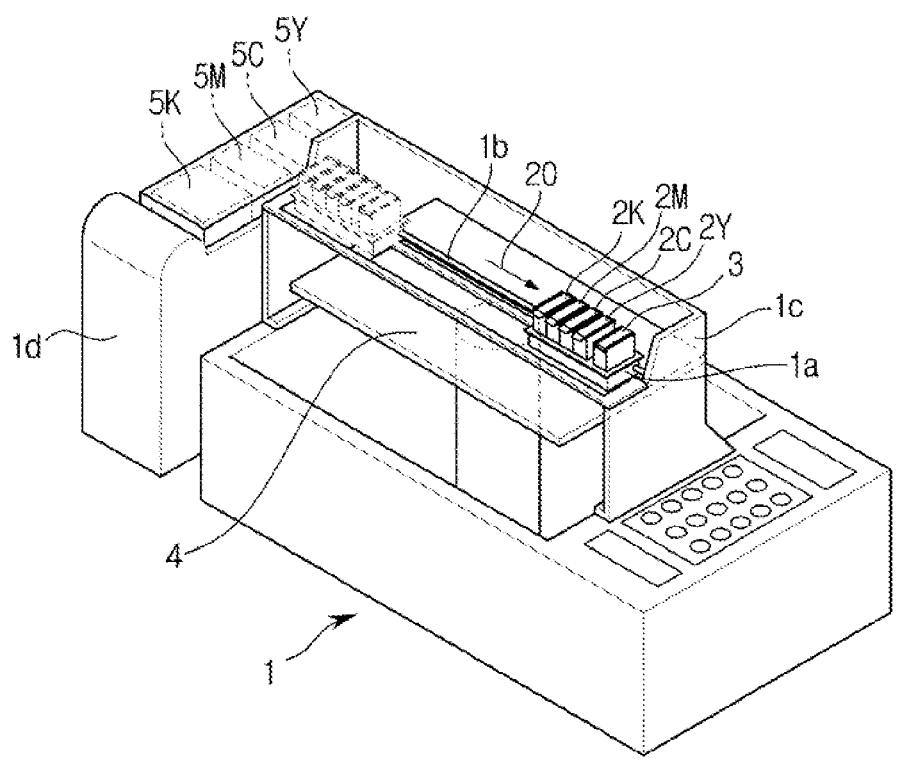
FIG. 2 is a perspective view illustrating a print head moving in a first direction of the 3D printer according to an embodiment of the present disclosure.

The print heads 2K, 2M, 2C, 2Y may be installed to be horizontally movable in a first direction 20 on the body 1 through the transfer module 1a and the guide road 1b, as illustrated in FIG. 2.

The print heads 2K, 2M, 2C, 2Y may include a first print head 2K injecting black color chemical ink, a second print head 2M injecting magenta color chemical ink, a third print head 2C injecting cyan color chemical ink, and a fourth print head 2Y injecting yellow color chemical ink.

Each of the print heads 2K, 2M, 2C, 2Y may include a head chip 21 installed on a lower surface of the print head to inject the chemical ink toward the stage 4 disposed on a lower side.

Figure 5:
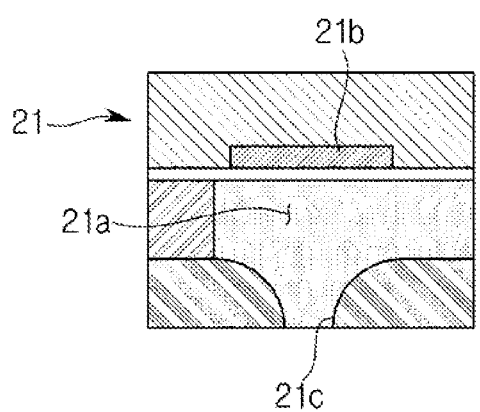
FIG. 5 is a cross-sectional view illustrating a head chip of the 3D printer according to an embodiment of the present disclosure.

As illustrated in FIG. 5, the head chip 21 may include an ink chamber 21a capable of receiving chemical ink, a heater 21b generating a bubble by heating the chemical ink stored in the ink chamber 21a, and a nozzle 21c injecting the chemical ink, for example, downward by an internal pressure of the ink chamber 21a increased according to generating a bubble inside the ink chamber 21a.

Figure 3:
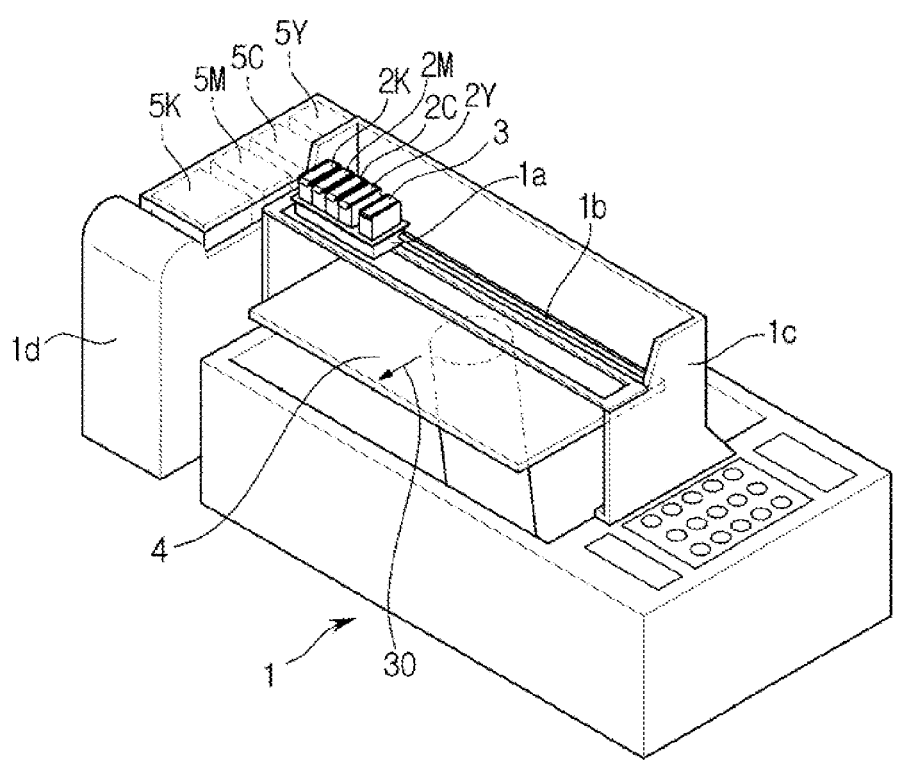
FIG. 3 is a view illustrating a stage moving in a second direction of the 3D printer according to the embodiment of the present disclosure.
Figure 4:
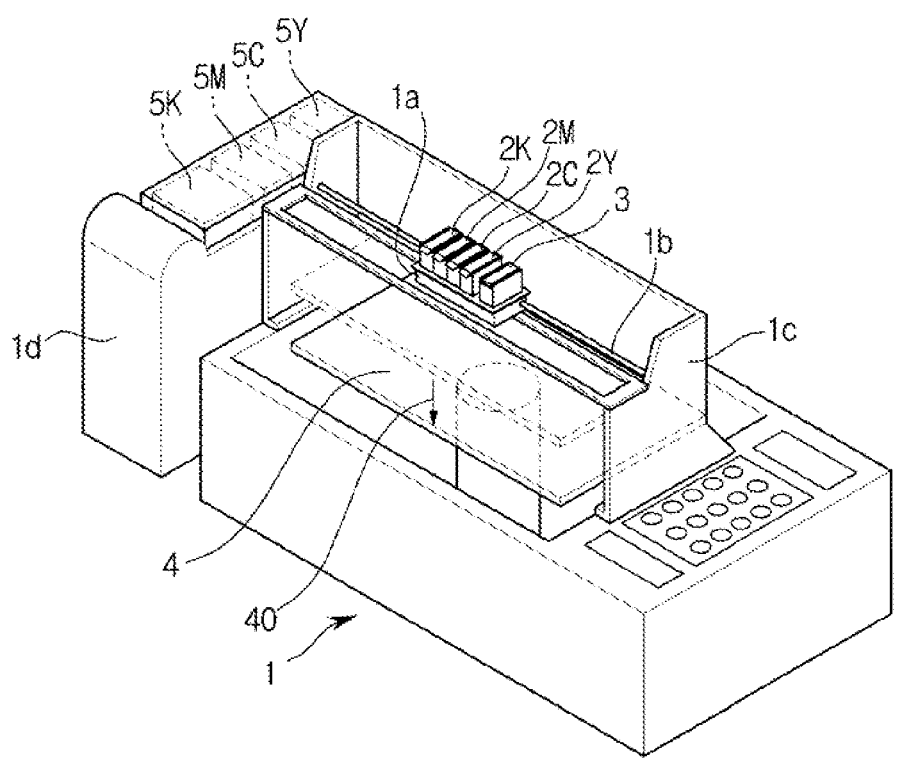
FIG. 4 is a view illustrating a stage moving in an upward and downward direction of the 3D printer according to the embodiment of the present disclosure.

As illustrated in FIG. 3, the stage 4 may be formed in a flat plate shape, which may be disposed horizontally. The stage 4 may be movable in a second direction 30, which is perpendicular to a first direction, and may be movable in upward and downward directions 40, as illustrated in FIG. 4.

A three-dimensional object having a length, a height and a width may be manufactured on the stage 4 by, for example, the combination of a motion of the print heads 2K, 2M, 2C, 2Y, which are movable in the first direction, and a motion of the stage 4, which is movable in the second direction and in an upward and downward direction.

The head chip 21 may include the ink chamber 21a to supply the chemical ink, the heater 21b generating a bubble by heating chemical ink stored in the ink chamber 21a, and the nozzle 21c injecting chemical ink downward by an internal pressure of the ink chamber 21a increased according to generating a bubble inside the ink chamber 21a.

The light source 3 may be installed in the transfer module 1a together with the print heads 2K, 2M, 2C, 2Y, and may irradiate light to chemical ink discharged from the print heads 2K, 2M, 2C, 2Y while moving in the first direction together with the print heads 2K, 2M, 2C, 2Y.

The light source 3 may include an ultraviolet lamp generating ultraviolet rays and irradiating ultraviolet rays on the stage 4, and the chemical ink may include ultraviolet curable chemical ink, which is harden by ultraviolet rays.

According to an embodiment of the present disclosure, the light source 3 may include an ultraviolet light emitting diode lamp. With an ultraviolet light emitting diode lamp, power consumption is small because of less heating, and a size of the ultraviolet light emitting diode lamp is small so that the ultraviolet light emitting diode lamp may be mounted, for example, to the transfer module 1a together with the print heads 2K, 2M, 2C, 2Y.

The plurality of ink tanks 5K, 5M, 5C, 5Y may include a first ink tank 5K storing black color chemical ink supplied to the first print head 2K, a second ink tank 5M storing magenta color chemical ink supplied to the second print head 2M, a third ink tank 5C storing cyan color chemical ink supplied to the third print head 2C, and a fourth ink tank 5Y storing yellow color chemical ink supplied to the fourth print head 2Y.

The ink tanks 5K, 5M, 5C, 5Y may be detachably installed in the ink storage unit 1d disposed on one side of the body 1, and may supply the chemical ink to the print heads 2K, 2M, 2C, 2Y through a connecting pipe (not shown).

When the ink tanks 5K, 5M, 5C, 5Y are detachably disposed on the body 1, a size of the ink tanks 5K, 5M, 5C, 5Y may be increased so that a large amount of chemical ink may be stored and also, the ink tanks 5K, 5M, 5C, 5Y may be easily replaceable after the chemical ink is exhausted.

An exemplary operating method of the 3D printer is described with reference to drawings.

Figure 6:
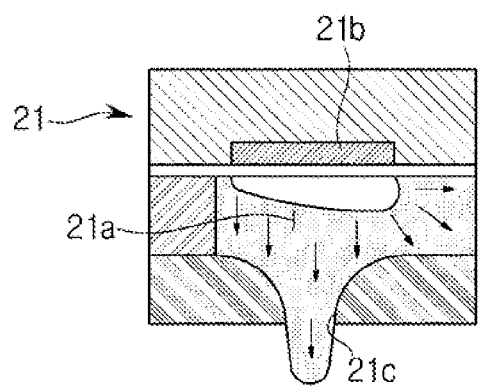
FIGS. 6 to 8 are cross-sectional views of a heap chip illustrating a process of the injection of chemical ink from the heap chip of the 3D print according to an embodiment of the present disclosure.

As illustrated in FIG. 5, when power is supplied to the heater 21b in a state in which the chemical ink is supplied to the ink chamber 21a, the chemical ink of the ink chamber 21a may be heated by a heat generated by the heater 21b and thus some amount of the chemical ink is evaporated thereby generating a bubble inside the ink chamber 21a, as illustrated, for example, in FIG. 6.

During a process of a phase change from a liquid state to a gas state, a volume change of some amount of the chemical ink may be large so that an internal pressure of the ink chamber 21a may be greatly increased.

Figure 7:
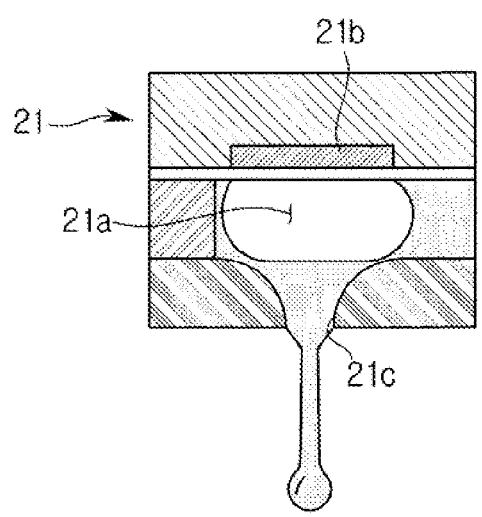

With a bubble increasing in size, the internal pressure of the ink chamber 21a may be increased and thus the chemical ink of the ink chamber 21a may be injected to the stage 4 on a lower side through the nozzle 21c, as illustrated, for example, in FIG. 7.

Figure 8:
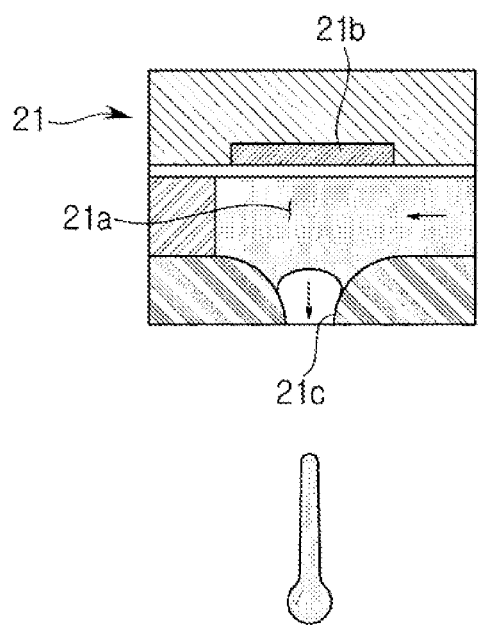

When the bubble reaches the nozzle 21c while the chemical ink is injected, gas filled in the bubble may be discharged to the outside through the nozzle 21c, as illustrated, for example, in FIG. 8. Therefore, the internal pressure of the ink chamber 21a may be rapidly decreased according to the injection of the chemical ink and the discharge of the gas so that negative pressure may occur inside the ink chamber 21a and the chemical ink of the ink tanks 5K, 5M, 5C, 5Y may be supplied to the ink chamber 21a and fill the chamber 21a.

In the print heads 2K, 2M, 2C, 2Y, each of the chemical inks may be injected through those processes, and the print heads 2K, 2M, 2C, 2Y may be selectively operated and inject the chemical ink according to desired color.

Light, which is generated from the light source 3 according to moving the transfer module 1a in the first direction, may be irradiated to the chemical ink injected on the stage 4 so that photocurable chemical ink may be hardened.

The injection and the hardening of the chemical ink may repeatedly occur while the transfer module 1a is moved in the first direction, as illustrated, for example, in FIG. 2, so that lines may be formed in the first direction.

The formation of the lines may be repeated while the stage 4 may be moved a predetermined distance in the second direction, as illustrated, for example, in FIG. 3, so that a surface may be formed by the lines.

After the completion of the formation of the surface, the formation of the surface may be repeated while the stage 4 may be moved a predetermined distance in the second direction, as illustrated, for example, in FIG. 3 so that manufacturing a desired three-dimensional object may be completed.

According to the embodiment of the present disclosure, the 3D printer may employ bubble jet method which is an internal pressure of the ink chamber 21a increased by generating bubble may allow the chemical ink to be injected. The head chip used for the bubble jet method may be miniaturized by being manufactured through an etching technology so that the size of the 3D printer may be largely reduced by using the head chip.

According to an embodiment of the present disclosure, the 3D printer may include the first print head 2K injecting black color chemical ink, the second print head 2M injecting magenta color chemical ink, the third print head 2C injecting cyan color chemical ink, and the fourth print head 2Y injecting yellow color chemical ink, but is not limited thereto. Depending on color of an object, the 3D printer may selectively include at least one of the print heads 2K, 2M, 2C, 2Y.

According to an embodiment of the present disclosure, the stage 4 may be movable in upward and downward directions, but is not limited thereto. For example, instead of stage 4, the print heads 2K, 2M, 2C, 2Y may be movable in upward and downward directions.

As is apparent from the above description, according to an exemplary 3D printer, the chemical ink inside the ink chamber may be heated by the heater so that a bubble may be generated inside the ink chamber. An internal pressure of the ink chamber increased by the bubble may allow the chemical ink of the ink chamber to be injected through the nozzle. Therefore, a three-dimensional object may be manufactured by a bubble jet method.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A three-dimensional printer comprising:
a plurality of print heads installed to be movable horizontally and inject color photocurable chemical inks, respectively;
a stage on which the color photocurable chemical inks injected from the plurality of print heads are stacked, wherein the plurality of print heads each comprise a head chip injecting a respective color photocurable chemical ink; and
a light source moveable with respect to the stage, and
wherein the head chip comprises:
an ink chamber to contain the respective color photocurable chemical ink,
a heater inside the head chip to apply heat to the respective color photocurable chemical ink in the ink chamber to generate a bubble inside the ink chamber, and
a nozzle to infect the respective color chemical ink responsive to an increase in an internal pressure of the ink chamber occurring when the bubble is generated inside the ink chamber while the heater applies heat to the respective color chemical ink,
wherein the light source horizontally moves together with the plurality of print heads along the stage to irradiate light to the respective color photocurable chemical ink injected from the nozzle and stacked on the stage,
the plurality of print heads and the light source are installed to be movable horizontally in a first direction, and
the stage is installed to be movable horizontally in a second direction perpendicular to the first direction and the stage is installed to be movable upward and downward.

2. The three-dimensional printer of claim 1, wherein at least the respective color photocurable chemical ink comprises an ultraviolet curable chemical ink hardening by ultraviolet rays, and the light source comprises an ultraviolet light emitting diode lamp.

3. The three-dimensional printer of claim 1, wherein the plurality of print heads comprise a first print head injecting black color chemical ink, a second print head injecting magenta color chemical ink, a third print head injecting cyan color chemical ink, and a fourth print head injecting yellow color chemical ink.

4. The three-dimensional printer of claim 3, wherein the 3D printer further comprises a first ink tank supplying black color chemical ink the first print head, a second ink tank supplying magenta color chemical ink to the second print head, a third ink tank supplying cyan color chemical ink to the third print head, and a fourth ink tank supplying yellow color chemical ink to the fourth print head.

5. The three-dimensional printer of claim 1, wherein at least the respective color photocurable chemical ink include an alcohol to lower a boiling point of the respective color photocurable chemical ink.

6. The three-dimensional printer of claim 1, further comprising:
a transfer module in which the plurality of print heads and the light source are mounted, and
a guide road extending in the first direction to guide the transfer module in the first direction.

* * * * *

UNITED STATES PATENT AND TRADEMARK OFFICE
CERTIFICATE OF CORRECTION

PATENT NO. : 10,710,297 B2
APPLICATION NO. : 14/582335
DATED : July 14, 2020
INVENTOR(S) : Ohyun Beak Page 1 of 1

It is certified that error appears in the above-identified patent and that said Letters Patent is hereby corrected as shown below:

In the Claims

Column 6, Line 14 (approx.):
In Claim 1, delete "infect" and insert -- inject --, therefor.

Column 6, Line 43 (approx.):
In Claim 4, after "ink" insert -- to --.

Signed and Sealed this
Eighth Day of September, 2020

Andrei Iancu
*Director of the United States Patent and Trademark Office*